United States Patent [19]
Langbroek et al.

[11] 3,961,665
[45] June 8, 1976

[54] APPARATUS FOR SEPARATING A PRODUCT OF SUBLIMATION FROM A GAS

[75] Inventors: Johannes Langbroek, Egmand aan de Hoef; Jan W. A. M. Koolen, Culemborg, both of Netherlands

[73] Assignee: Ultracentrifuge Nederland N.V., The Hague, Netherlands

[22] Filed: Oct. 8, 1974

[21] Appl. No.: 513,171

[30] Foreign Application Priority Data
Oct. 31, 1973  Netherlands ................7314937

[52] U.S. Cl. ........................... 165/61; 165/111; 165/146; 55/269; 23/294 R; 165/159
[51] Int. Cl.² .................. B01D 7/00; F28F 13/00
[58] Field of Search .......... 165/146, 147, 111, 142, 165/61, 159; 55/269; 23/264, 294

[56] References Cited
UNITED STATES PATENTS

| | | | |
|---|---|---|---|
| 2,214,838 | 9/1940 | McGavock | 23/294 |
| 2,852,517 | 9/1958 | Lynn | 260/268 |
| 2,955,807 | 10/1960 | Riley et al. | 165/146 X |
| 3,084,914 | 4/1963 | Davis | 165/146 X |
| 3,609,943 | 10/1971 | Richter | 55/269 X |
| 3,682,241 | 8/1972 | Clauss et al. | 165/142 X |

FOREIGN PATENTS OR APPLICATIONS

| | | | |
|---|---|---|---|
| 7,117,037 | 6/1973 | Netherlands | |
| 702,081 | 1/1954 | United Kingdom | |
| 746,183 | 3/1956 | United Kingdom | |
| 847,119 | 9/1960 | United Kingdom | 23/294 |

Primary Examiner—Albert W. Davis, Jr.
Attorney, Agent, or Firm—Cushman, Darby & Cushman

[57] ABSTRACT

Apparatus for separating a product of sublimation from a gas, in which this product is condensed in solid form on the cooling surface of a bank of parallel tubes of unequal length, so arranged that near the vapor inlet, where the solid deposits are first settling on the tubes, the distance between the tubes present there, is greater than in locations inside the apparatus farther from the inlet.

8 Claims, 12 Drawing Figures

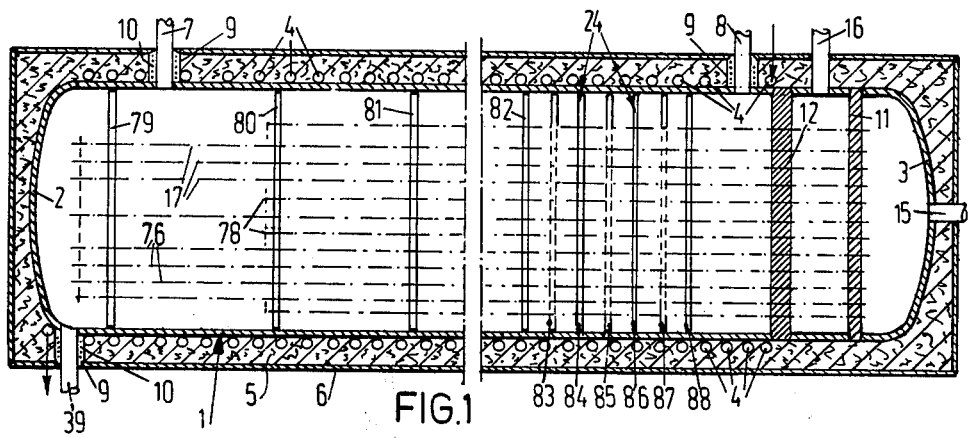
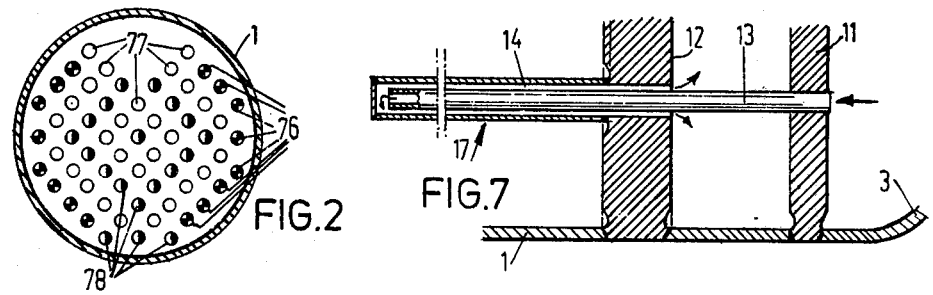
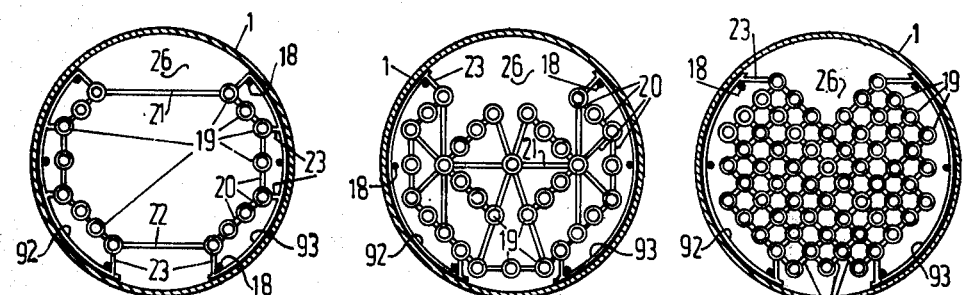
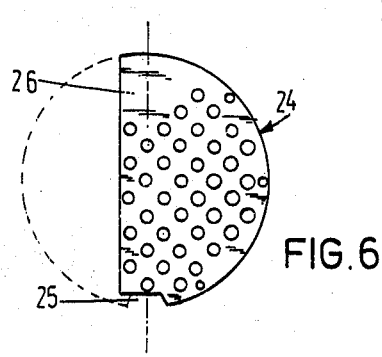

APPARATUS FOR SEPARATING A PRODUCT OF SUBLIMATION FROM A GAS

The invention relates to an apparatus for separating a product of sublimation from a gas in which this product is present in the form of vapor, comprising an elongate housing the wall of which is provided with heat-exchangable means capable of maintaining the housing at temperature above the melting point of the product of sublimation, furthermore comprising an internal system of heat-exchanging tubes upon which the product of sublimation can precipitate in solid form, which internal system is arranged around the central longitudinal axis of the elongate housing and consists of a tube bank the tubes of which are connected to one or more tube plates near one end of the elongate housing.

Apparatus of this nature is already known. In practice, however, blockages are liable to occur in them owing to the fact that large lumps of sublimed material obstruct the passage from the gas to the outlet in whole or in part, although there have been prior attempts to obviate this problem.

For instance, in British Pat. No. 746,183 it is suggested to minimize the chances of blockage by progressively decreasing the cross-sectional area of the chamber, or by providing a progressively greater number of cooling tubes in successive cooling zones so that the distance between adjacent tubes of each such zone becomes progressively smaller in the direction of gas flow. The tubes in such a case are arranged perpendicularly to the direction of gas flow, however, rather than parallel thereto, no cooling tubes are provided that are disposed in more than one zone, thus requiring the use of a large number of separate cooling tubes, and the cooling tubes nearest the gas inlet are not arranged near the surface of the chamber so that even though the tubes are spaced far apart, thus there is still a greater chance for the gas flow to be blocked than according to the present invention.

According to the present invention, a single set of tubes — the tubes being of various lengths — are provided for cooling, the tubes being arranged parallel to the direction of gas flow, and the longest tubes preferably being located near the interior surface of the chamber. In this way, a large gap is provided near the gas inlet, and the tube density increases gradually therefrom and the chances of blockage are greatly reduced.

Tube density in the above is defined as the number of tubes in a given cross section through the elongate housing.

The tube density preferably is caused to pass as gradually as possible from a low tube density near the inlet to a high tube density near the outlet. At the same time, the longest tubes are arranged near the inside wall of the housing, which tubes will hereinafter be referred to as surface tubes, while the shortest tubes dominate in the central portion of the tube bank. The portion of the tube bank situated around the central portion but inside the surface tubes is constituted partly by short tubes and partly by medium-length tubes.

As a result of the measures described hereinabove, a kind of cavity is created near the inlet of the gas, i.e. exactly at the point where the product of sublimation will first be deposited. However, since there are now fewer tubes at that point, it has become substantially impossible for the desublimer to become obstructed as a result of a large lump of sublimed material accumulating near the inlet on the tubes.

The above principle of design can be applied to hair-pin tubes as well as to bayonet tubes, but it has been found that especially the latter type is particularly suitable for attaining the aforementioned effect.

A further improvement is obtained by supporting the tubes at regular intervals by tube grids that are attached to the housing and each of which is composed of meshes, in such a way that each mesh passes and supports only one tube element. Furthermore, the number of meshes is limited to the number of tubes that are present at that point.

As a result, the resistance of these tube grids for the gas flow is particularly low, owing to the complete absence of any unnecessary structural parts.

Another major advantage of the tube grids is that they do not guide the gas flow perpendicularly to the tube wall, as in the case of supporting plates, but allow a gas flow more or less parallel to the tubes. This allows a more uniform accumulation of product to be obtained at the tube wall, causing the output of the desublimer to be increased.

For the same reason of output improvement, the gas flow on the outlet side is guided by baffle plates in a direction perpendicular to the tube wall so as to provide better contact between gas and tube wall, while the possibility of freezing of the desublimer is eliminated because of the fact that the gas still contains only a small amount of product.

As an additional precaution, a zone which contains no tubes is left over the entire length of the tube bank on one side thereof.

Since the apparatus described will in most cases be arranged in a horizontal or substantially horizontal position, it is more effective to select the upper side of the desublimer for the tubeless zone. The absence of tubes therein, or at least in a troughed zone, will make it impossible for obstruction to occur in that zone, not even in the surface tubes. It is thus ensured that the gases can always find an unobstructed path to the outlet.

It is better for desublimers of the type described hereinabove not to be erected vertically. In such case, heating could cause large lumps of the product of sublimation to become detached and to fall, as a result of which the internal structure might be damaged or the discharge end obstructed.

A further drawback of such large, detached lumps is that the heat from outside can penetrate only slowly into them if the thermal conductivity of the product of sublimation is low.

In order to facilitate the discharge of fused product, the elongate housing of the sublimer is arranged at a faint inclination to the horizontal, use preferably being made of an incline with a slope of about 1 in 5.

The tube grids described in the above are attached at only a few points to the inside of the housing, use being made of hinged strips. This method offers several advantages, especially if the desublimer is to operate at temperatures down to, for example, $-200°$ C.

HINGED STRIPS

The hinged strips are not fastened to the wall, but to bent strips, so-called wall strips, which freely adjoin the wall. Tie rods are furthermore provided which connect the wall strips to each other, for example by welding these tie rods to the wall strips. The tie rods serve to space the baffle plates and the tube grids at the desired distance from each other. This is necessary for the assembly of the desublimer.

Since these hinged strips are touching the wall at only a few points, there are very few points of contact through which ambient heat could leak toward the inside. Another result is that less insulating material has to be applied to the outer wall of the housing.

A hinged strip as referred to in the above indicates a strip which is attached both to a wall strip and the the grid, and the flat surface of which is perpendicular to a cross section through the elongate housing. As a result of this measure, these strips can bend readily, so that they can easily follow the motions of the grid resulting from thermal expansion.

As an additional precaution, the inlet and outlet stubs for the gas charged with vapor of a product of sublimation are wound with an electric resistance heating wire. An electric current is passed constantly through this wire, so that the heat generated makes it totally impossible for the product of sublimation to settle in the inlet and outlet connections and thus to obstruct the line.

A medium such as freon gas, which is cooled during the process of sublimation and heated during the heating process, is caused to flow through the internal tube bank of the desublimer.

At the beginning of the cooling process a quantity of hot freon gas is mixed with cold freon gas in order to prevent thermal shocks. The same is done when changing over to heating.

During operation, heat is continuously applied to the inside wall of the desublimer vessel with the use of a coil through which heated freon is flowing. The same is done with the inlet stub for the gas which is impregnated with a product of sublimation, and with the outlet of the gases that are moving towards a cooling vessel and a vacuum pump. The aforementioned electric resistance wire is wound around these inlet stubs. The gradual change-over from heating to cooling is brought about by adding first a small amount and then a larger amount of heating or cooling medium to the other medium until the temperature changes are accomplished as gradually as possible.

The invention will now be explained in further detail with the aid of a number of embodiments. The embodiments described are illustrated in the following figures, where:

FIG. 1 is a vertical cross section through a desublimer according to the invention.

FIG. 2 indicates the distribution of long, short and medium-length tubes over a cross section of the desublimer.

FIGS. 3, 4 and 5 are tube grids arranged in the desublimer according to FIG. 1 in a cross section thereof.

FIG. 6 is a baffle as used in the desublimer according to FIG. 1.

FIG. 7 is a deatil of the bayonet tubes used in FIG. 1.

Figures 8, 9, 10, 11:
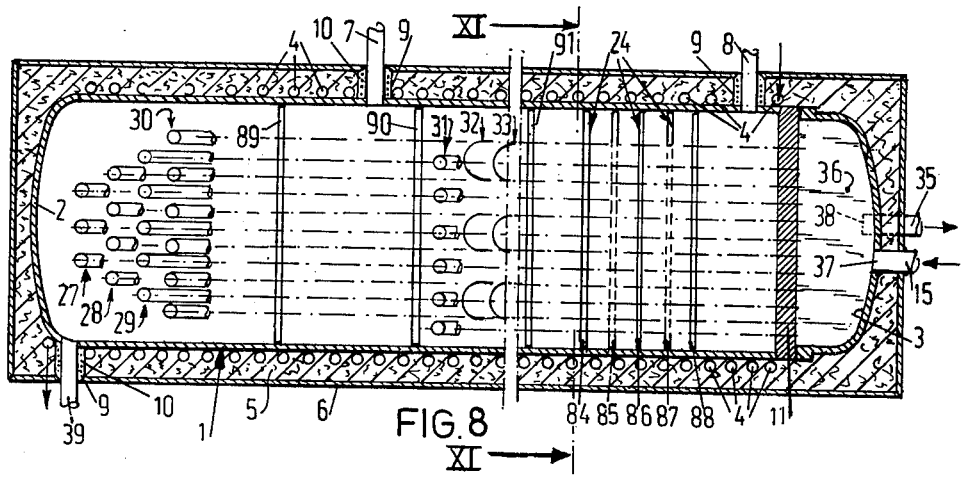
FIG. 8 is a horizontal cross section through a desublimer constructed with hairpin tubes.
FIGS. 9 and 10 are cross-sectional views of the pipe grids in the desublimer according to FIG. 8.
FIG. 11 is another cross section through the desublimer shown in FIG. 8.

In FIG. 1, the desublimer vessel is indicated by the number 1. The vessel is closed at the ends with lids 2 and 3, and a heating coil 4 is provided on the outside of the cylindrical wall surface. The combination is surrounded by a layer of heat-insulating material 5, the outside of which is covered with sheeting 6. An inlet 7 is provided for the gas to be treated. The treated gases leave the desublimer through the connection 8. The two connections are fastened to the vessel wall 1 with the use of a sleeve 9, the outside of the sleeve 9 being surrounded by an electric resistance heating wire 10.

Two tube plates 11 and 12, in which the ends of the bayonet tubes 13 and 14 are fitted (see FIG. 7), are provided near the gas outlet 8. The heat transferring medium which is to flow through the tube bank 17 is admitted through the inlet stub 15 and discharged through the stub 16. Three different tube grids are used in the desublimer shown. They are provided at 79, 80, 81 and 82. The design of these grids is indicated in the cross sections through the desublimer shown in FIGS. 3, 4 and 5. The strips 92 and 93 loosely adjoin the inside of the cylindrical wall 1. These cross sections also indicate that tie rods are attached to certain parts of the wall against the inside thereof. These rods are fastened to the strips 92 and 93.

The grids themselves are constituted by a number of meshes consisting of short, cylindrical sleeves 19 which are mutually connected by strips 20. The facing portions of this tube grid are in turn mutually connected by strips 21 and 22. The supporting grid is attached to the wall by means of hinged strips 23. FIG. 2 shows, in a cross section through the desublimer, the distribution of long tubes 76, short tubes 77 and medium-length tubes 78.

FIG. 6 illustrates a baffle 24, a number of which are provided in the desublimer at the points 83, 84, 85, 86, 87 and 88 (see FIGS. 1 and 8). These baffles overlap each other and are provided at the lower side with a passage 25 which allows the molten product of sublimation to move with ease along the bottom of the vessel. This figure, like the preceding FIGS. 4 and 5, furthermore indicates that the upper side comprises a zone 26 in which no tubes are accommodated. It is along this zone, therefore, that the gas can constantly move towards the outlet.

FIG. 8 illustrates a variant of the desublimer described in the above, likewise in horizontal longitudinal section, but constructed with hairpin tubes. In this case, use has again been made of very long tubes 27, 28, 29 and 30, as well as of much shorter tubes 31, 32 and 33. As a result, a space 34 within which there are no tubes is formed near the inlet 7. The desublimer, again provided with tube grids 89, 90 and 91, of which 89 and 91 are shown in FIGS. 9 and 10, respectively, and with a number of baffles 85, 86, 87 and 88 of the type already shown in FIG. 6, is furthermore equipped with an inlet 15 and an outlet 35 for the medium which is to flow through the tube bank. The vertical division plate 36 divides the space underneath the lid 3 into an inlet space and an outlet space. The line 37 opens in front of this plate and the line 38 behind it.

The vessel is furthermore provided with a drain 39 for the molten product of sublimation. This outlet is likewise provided with an electric resistance heating wire 10.

FIGS. 9, 10 and 11 will not require much explanation after what has been said above. FIG. 11 illustrates a transverse section through XI—XI. It shows the relatively short hairpin tubes 31, 32 and 33 as well as the holes 75 in the baffles 24 intended for passing the longer hairpin 27 through 30.

Figure 12:
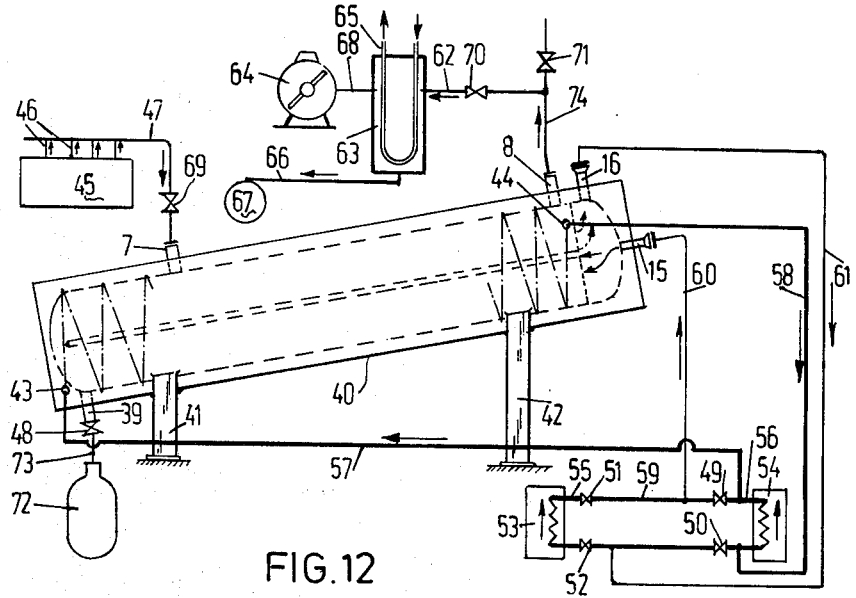
FIG. 12 illustrates diagrammatically how the desublimer can be incorporated into a process.

FIG. 12 illustrates a desublimer 40 in a lateral view, at the angle of slope which has proved most effective. The desublimer is supported by two supports 41 and 42 of unequal length. The numbers 43 and 44 indicate the inlet and the outlet of the heating coil which is provided on the outside wall of the vessel 1 (see FIG. 1). The gases, steeped with a product of sublimation, comes from a processing installation 45, the gaseous mixture from which is collected with the aid of collecting pipes 46 all of which open into the line 47 through which this mixture is conveyed to the inlet stub 7. In this phase, the valve 48 is closed, just as the valves 49 and 50, whereas the valves 51 and 52 are open. The number 53 indicates an installation through which freon can so circulate that it is discharged at 55 in the cooled state. In the installation 54, however, a heated flow of freon is delivered at 56. A flow of this moves under all circumstances through the line 57 to the connection 43 of the heating coil 4. This freon returns through the outlet 44 and the line 58 to 54, so that it may be reheated. The freon which has been cooled in 53 flows through the lines 59 and 60 to the inlet 15 of the internal tube bank of the desublimer. When it has passed through this, it leaves the desublimer through the connection 16 and returns through the line 61 to the cooling installation 53.

The gas outlet 8 connects to a line 62 which communicates by way of a cooling vessel 63 with a vacuum pump 64. A cold medium 65 flows through the cooling vessel 63, so that any undesired gaseous admixtures can be liquefied and removed through the line 66 to a receptacle 67. The remaining flow of gas which has left the desublimer through the line 62 will consist substantially of air, which moves through the line 68 towards the vacuum pump 64, whereupon it is discharged into the atmosphere.

While this sublimation is being implemented, a vacuum will be reached inside the desublimer vessel under the action of the usually low temperature. The valve 69 is closed as soon as this vessel has become sufficiently filled with product of sublimation that has settled on the tubes of the tube bank. Subsequently, the valves 51, 52 and 70 are closed, and the valves 49 and 50 opened. (In practice, these valves will be opened gradually with the aid of various by-pass valves, not shown, so as to prevent the temperature change from being excessively abrupt). Since a higher temperature is gradually reached inside the desublimer 40, the vacuum will eventually vanish. Atmospheric air can penetrate through the line 74 into the desublimer, so that the molten product of sublimation can drain off through the line 73 so as to be collected in a transport vessel 72.

We claim:

1. Apparatus for separating a product of sublimation from a gas in which this product is present in the form of a vapor, comprising
   a. a housing, elongated in a generally horizontal dimension, and having an inner wall,
   b. means surrounding said housing for maintaining said housing at a temperature above the melting point of the product of sublimation, said means including heat-exchanging means,
   c. a gas inlet at one end of said housing,
   d. a drain for removing a molten product of sublimation from said housing,
   e. a gas outlet at the end of said housing opposite said gas inlet end, gas introduced at said gas inlet flowing in a path toward said gas outlet,
   f. means for providing the precipitation of the product of sublimation in solid form while minimizing the opportunity for blockage of said gas path by precipitated solid, said means including (i) a plurality of cooling tubes of different lengths including tubes of longest and shortest length, (ii) means near the gas outlet end of said housing for mounting said tubes generally parallel to the dimension of elongation of said housing and generally parallel to the path of said gas so that only the longest tubes extend to said gas inlet end of said housing and so that the tube density increases from said gas inlet toward said gas outlet, said mounting means including tube plates near the gas outlet end of said housing, and (iii) inlet and outlet means for a heatexchanging medium flowing in said tubes communicating with said tube plates and said tubes mounted thereby.

2. Apparatus as recited in claim 1 further comprising means for mounting the longest tubes near the inside wall of said housing thereby forming a number of surface tubes and defining a large open space in said housing near said gas inlet.

3. Apparatus as recited in claim 1 further comprising means for mounting the shortest tubes near the central portion of said housing.

4. Apparatus as recited in claim 3 further comprising means for mounting tubes of intermediate length in a portion of said housing spaced from the inner surface and the central portions thereof.

5. Apparatus as recited in claim 1 wherein said cooling tubes are bayonet tubes, said inlet and outlet means for said heat exchanging medium flowing through said tubes being spaced from each other along the dimension of elongation of said housing.

6. Apparatus as recited in claim 1 further comprising means for facilitating the drainage of a molten product of sublimation from said housing, said means including means for mounting said housing at an inclination of about 1 in 5 to the horizontal.

7. Apparatus as recited in claim 1 further comprising a gas inlet stub at said gas inlet, and a gas outlet stub at said gas outlet, and electric resistance heating wire wound around each of said gas inlet stub and said gas outlet stub.

8. Apparatus as recited in claim 1 further comprising baffle means disposed in said gas path in said housing.

\* \* \* \* \*

UNITED STATES PATENT OFFICE
CERTIFICATE OF CORRECTION

Patent No. 3,961,665      Dated June 8, 1976

Inventor(s) Johannes Langbroek and Jan W. A. M. Koolen

It is certified that error appears in the above-identified patent and that said Letters Patent are hereby corrected as shown below:

At paragraph [21] on the front page format, after "Appl. No.:" delete "513,17<u>1</u>" and insert --513,174--.

Signed and Sealed this

Twenty-second Day of April 1980

[SEAL]

Attest:

SIDNEY A. DIAMOND

*Attesting Officer*      *Commissioner of Patents and Trademarks*